A. W. WILKINSON.
Manufacture of Illuminating Gas.
No. 9,595. Reissued March 1, 1881.
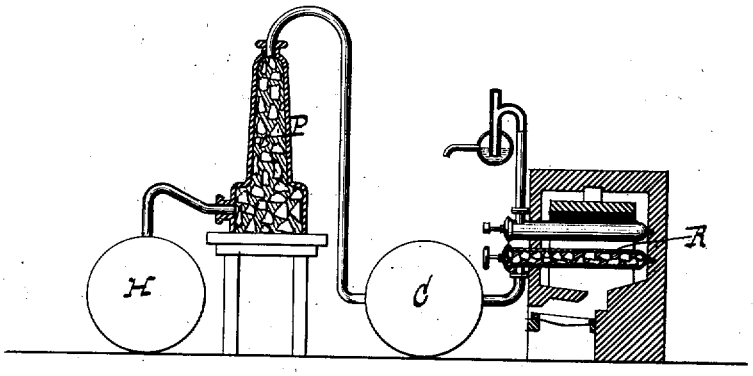
Witnesses.
Otto Hufeland
William Muller
Inventor.
Asa W. Wilkinson
by Van Santwood & Hauff
his attorneys

UNITED STATES PATENT OFFICE.

ASA W. WILKINSON, OF NEW YORK, N. Y.

MANUFACTURE OF ILLUMINATING-GAS.

SPECIFICATION forming part of Reissued Letters Patent No. 9,595, dated March 1, 1881.

Original No. 123,538, dated February 6, 1872; Reissue No. 4,821, dated March 19, 1872; Reissue No. 5,149, dated November 19, 1872.
Application for reissue filed March 31, 1880.

*To all whom it may concern:*

Be it known that I, ASA W. WILKINSON, of the city, county, and State of New York, have invented a new and useful Improvement in the Manufacture of Illuminating-Gas; and I do hereby declare the following to be a full, clear, and exact specification, reference being had to the accompanying drawing, which represents a sectional view of the apparatus which I use in carrying out my invention.

This invention consists in manufacturing illuminating-gas by mixing hydrogen gas which is free from impurities, particularly such containing oxygen, with hydrocarbons derived from naphtha, gasoline, bituminous coal, or other suitable materials, and then passing the mixture through one or more retorts heated to the desired degree, whereby a permanent gaseous compound is obtained of superior illuminating power.

In the preparation of hydrogen gas by the mutual action of acids and metals, or of steam or vapor of water in contact with metals or carbon in some form at or above a red heat, or carbonic acids and hydrate of lime at the same temperature, or by any other of the known processes, the hydrogen gas is contaminated with vapor of water, carbonic oxide, sulphureted hydrogen, or other undesirable products, which should be removed for the accomplishment of the result I seek. Thus, if hydrogen associated with the vapor of water be passed through a carbureter charged with hydrocarbons, and then through heated retorts, the water combines with a portion of the hydrocarbon vapors, producing various acids and other compounds, which, when mixed with the illuminating-gas, materially deteriorates its illuminating power. So, likewise, if hydrogen is mingled with carbonic oxide and passed through a carbureter charged with hydrocarbons, and then through heated retorts, a reaction ensues, producing carbonic and other acid gases, which, as in the preceding case, impair the photometric value of the illuminating-gases with which they are mingled. In freeing the illuminating-gas of these deteriorating gases and vapors by various purifying processes many of the most highly-valued illuminating agents are abstracted; hence I avoid their production by employing pure hydrogen.

The discovery of the fact that the hydrogen must be pure, or nearly so, for the purpose of making an illuminating-gas with rich hydrocarbons, forms the real base of my invention; and I have succeeded in producing a cheap and superior illuminating-gas by the following process.

If the hydrogen gas contains carbonic oxide I pass it through purifiers containing hydrate of lime, hydrate of soda or potassa, or hydrate of iron at a red heat, to absorb this impurity. If the hydrogen gas contains the vapor of water I pass it from the receiver H (which by being kept cool will partly condense the water) through one or more purifiers containing chloride of calcium or caustic lime, or other suitable material capable of absorbing the watery vapors. After the hydrogen gas has been purified I pass it through a carbureter, C, where it takes up a quantity of hydrocarbon vapors, forming, however, a mere mechanical mixture, which cannot be passed through pipes and consumed like a permanent gas, because, on being passed through pipes exposed to a low temperature, these hydrocarbon vapors condense, and the illuminating power of the mixture is lost or greatly diminished. The mixture of hydrocarbon gases, vapors, and hydrogen gas is finally converted into a permanent gas by passing it through one or more retorts, R, heated to a red heat, and filled with coal, pieces of brick, iron turnings, or other refractory material, whereby the current of the gas is broken and the same is uniformly heated. On leaving the retort the gaseous mixture has become a permanent gas of superior illuminating quality, which may be subjected to a low degree of heat without condensation, the excess of hydrogen gas preventing a deposit of carbon or coal-tar in the retort, thus utilizing every particle of the hydrocarbon and supplying the best possible diluent.

By regulating the quantity of hydrogen gas I have within my power the facility to make a gas of any illuminating standard that may be required; and since the illuminating power depends upon a proper mixture of illuminating and non-illuminating gases it will be readily conceded that a gas thus constituted will have great advantages, not only in illuminating power, but in requiring a much smaller quantity of oxygen for its combustion than a gas derived from the distillation of bituminous coal alone—a fact too often neglected in the use of gas for the purpose of illuminating in our dwellings; and, furthermore, it is a well-known fact that coal-gas is contaminated with chloride of sodium, sulphur compounds, and other impurities, which impart to the flame a yellow tint and contaminate the air of the apartments in which it is burned with deleterious and destructive vapors, while the flame of my gas is white and brilliant, and being made of pure hydrocarbon cannot produce any of these destructive compounds.

In passing illuminating-gas through water and lime purifiers some of the most valuable illuminating compounds are absorbed.

My gas requires no purification; but at the same time it contains a sufficient amount of odorous materials to be recognized in case of leakage.

I am aware of the English Patent No. 14,238 of 1852, which describes and shows certain means for producing gas for heating and illuminating purposes; but the various apparatus shown in said patent are different from mine, and I disclaim distinctly the arrangement shown therein.

I do not claim as my invention the manufacture of illuminating-gas by passing water-gas (which is a mixture of hydrogen, carbonic oxide, and vapor of water, and which is sometimes erroneously termed "hydrogen gas,") mixed with hydrocarbons through a heated retort; but

What I claim as new, and desire to secure by Letters Patent, is—

1. The process of manufacturing illuminating-gas by mixing hydrogen gas which is free from impurities, particularly such containing oxygen, with hydrocarbons and then passing the mixture through a red-hot retort, substantially as described.

2. The combination of the receiver H, purifier P, carbureter C, and retort R, arranged in relation to each other for joint action, substantially as and for the purpose herein shown and described.

In testimony that I claim the foregoing I have hereunto set my hand and seal, this 29th day of March, 1880.

A. W. WILKINSON. [L. S.]

Witnesses:
W. HAUFF,
E. F. KASTENHUBER.